June 4, 1946.   A. C. REDFIELD ET AL   2,401,583
METHOD OF SEA WATER FOAM SUPPRESSION AND APPARATUS
Filed Dec. 23, 1944
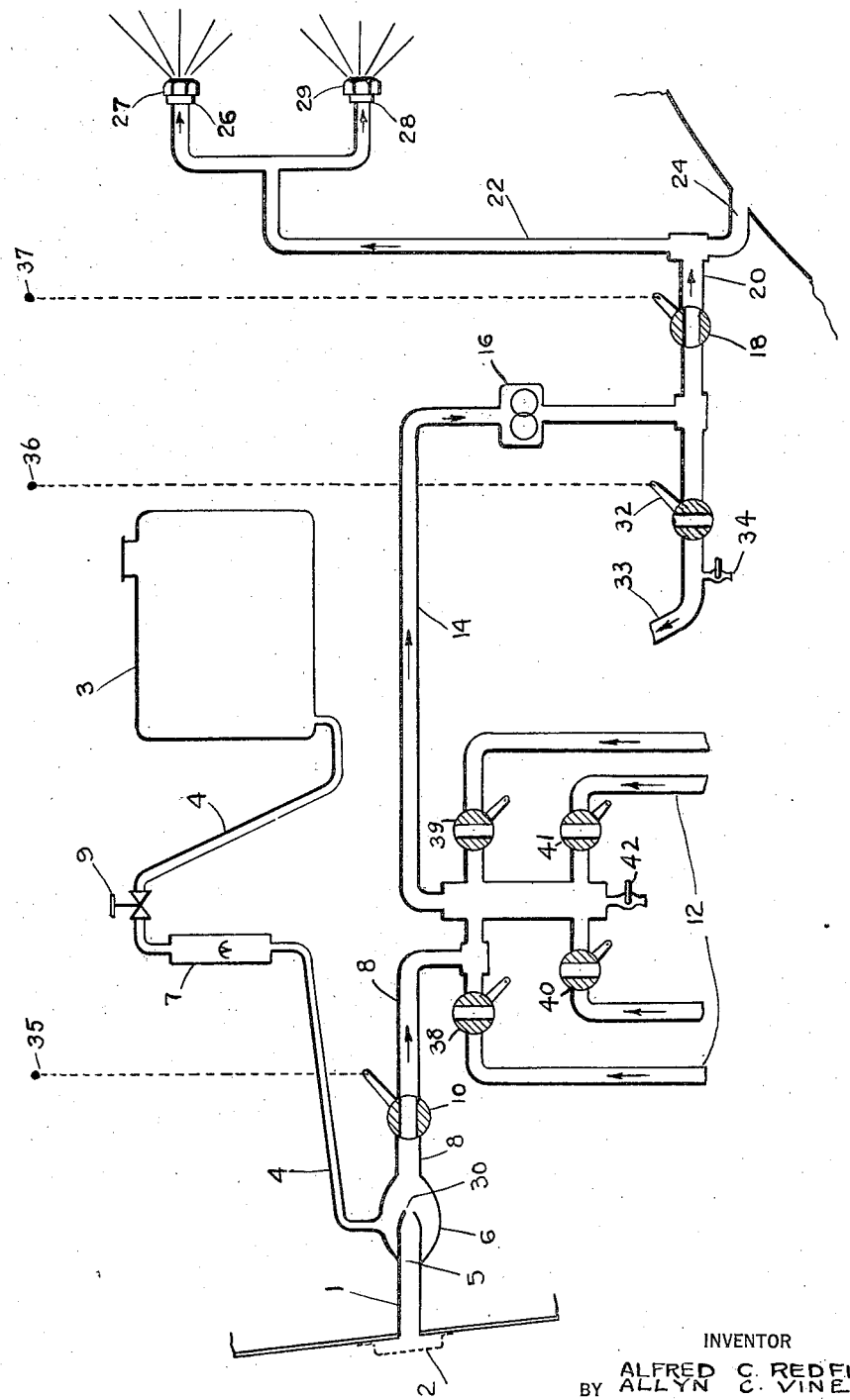
INVENTOR
ALFRED C. REDFIELD.
BY ALLYN C. VINE
ATTORNEY Patented June 4, 1946

2,401,583

UNITED STATES PATENT OFFICE 2,401,583

METHOD OF SEA WATER FOAM SUPPRESSION AND APPARATUS

Alfred C. Redfield and Allyn C. Vine, Woods Hole, Mass.

Application December 23, 1944, Serial No. 569,532

13 Claims. (Cl. 114—15)

This invention relates to a method of suppressing the visibility of a wake formed in water by the passage of a vessel along the surface thereof and to apparatus and material for performing such method.

The disruption of foam formed by disturbance of the water by passage of a vessel is necessary particularly in wartime naval activity to render the wake substantially invisible and to prevent the detection of the vessel, particularly from enemy air craft which may not be sufficiently close to the vessel to observe it, but nevertheless sufficiently close to observe the wake. It will be understood initially that it is not practical to use a method or quantity of material for this purpose which itself will substantially change the characteristic appearance of the surface of the water from the air, and thus materials which form substantial "slicks" are not available to be used in quantity for this purpose.

It has heretofore been attempted to devise methods and means to prevent the formation of and to suppress the wakes attendant upon the passage of a vessel on the surface of the water, but these heretofore proposed means have been impractical for various reasons. The most important of these resides in the approach made to the problem in that the attempt has been made to color the foam in a manner to make it less light-reflecting, rather than to prevent the formation of the foam or to suppress it immediately on formation. One of the greatest disadvantages of the coloring method is the relatively unavailable chemicals which are designated as the necessary materials to be used, the provision of which chemicals at distant points of military activity would present serious supply problems. Another problem which previously proposed methods have failed to solve is the necessity of carrying a large amount of material on the vessel itself, which, especially in smaller vessels, results in a substantial reduction of available carrying space for armament and consequent decrease in the efficiency of the vessel also from the standpoint of speed and maneuverability.

It is a particular advantage of this invention that the materials proposed to be used are immediately available at any field of action where vessels are operating, since preferred materials are necessary to the operation of vessels in any field, and the required additional quantity of the material needed for the practice of the present invention would present no great problem of supply.

It is another advantage of this invention that the sea water itself through which the vessel is progressing is utilized in the practice of the invention, being drawn into the vessel, mixed with the de-foaming agent and expelled from the vessel, thus placing no strain upon the carrying capacity or speed of the vessel itself. Other objects and advantages of the invention will be more apparent from the following description and drawing.

In the drawing which is exemplary and which forms a part of this specification, the figure is a schematic showing of the system as applied to a vessel for the performance of the method of this invention.

The disturbance of water caused by the passage of a vessel travelling on the surface thereof results in the mixing of a considerable quantity of air with the water, which mixing is visibly apparent in the form of foam or a large number of small bubbles. According to the method of this invention the disruption of this foam may suitably be accomplished by causing the collapse of these bubbles within a few seconds after their formation, whereby the wake left by the vessel is substantially invisible. It has been found that the distribution of a suitable material to the point of formation of the foam has a substantial effect in causing the collapse of these bubbles, thereby rendering the wake invisible. It has further been found that a relatively substantial quantity of foam-modifying material is necessary to achieve proper distribution, particularly in the case of vessels moving at relatively high speeds, or which, because of their peculiar hull design, churn up a considerable quantity of foam even at low speeds. Consequently, to avoid the necessity of carrying a large quantity of material for this purpose on the vessel, we have used a suitable foam disrupting agent, mixed the agent with sea water taken into the vessel, and expelled the mixture of agent and sea water at or near the points of greatest foam formation, thereby utilizing the sea water itself as a component part of my foam-disrupting material.

For foam-disrupting materials we have found useful any convenient material which tends when emulsified with water by agitation, and when further intimately mixed with sea water in foamy condition, to break bubbles already formed. While the theoretical background of this action is not fully understood, it is believed that the combination of sea water and hydro-carbon material in emulsified form as discharged from the vessel comprises a large number of tiny droplets of the hydro-carbon material. Because of the disturbance of the water through which the vessel is moving an intimate combination between the mixture discharged from the vessel and the sea water immediately occurs. The tiny droplets of hydro-carbon material are mixed with the foamy sea water and on coming to the surface disturb the forces which tend to hold the bubbles in more or less equilibrium, whereby the bubbles break and the air therein is released. In any event, we do not limit ourselves to any theoretical explanation of the action involved.

We have found particularly useful various materials of a generally hydro-carbon nature. We prefer to use materials having a viscosity between that of kerosene or light oil and Diesel fuel oil or the like. As a particular example we may suggest Diesel fuel oil, both because of its high effectiveness and because of its immediate availability at any point where ships are being operated. However, it will be understood that the materials designated are not necessarily critical, and other materials emulsifiable with water and in the proper viscosity range, or having suitable foam-disrupt-properties when combined with sea water as described, may be substituted, particularly where local conditions dictate the desirability of such substitution. It will, of course, be understood that the material used should necessarily be of a substantially non-corrosive character.

Referring now to Figure 1, a system for pumping the sea water into the vessel, combining the foam-suppressing agent therewith, and pumping the mixture out of the vessel, is diagrammatically illustrated. The intake 1 is preferably provided with a screen 2 to prevent the intake of any solid materials which may be in the sea water. The suppressor fluid tank 3 may suitably be disposed at any convenient point in the vessel and may be connected by a tube 4 to a suction fitting 6 which may take any desired form, a preferred example being the well-known Venturi tube described below. The tube 4 may suitably be provided with a sight gauge 7, preferably mounted in position for observations by the operator of the vessel so that he may be advised of the rate of flow from the tank 3 to the suction fitting 6. Also is provided a needle or other convenient valve 9 by which the operator may adjust the flow from tank 3. The material passes from the suction fitting 6 through the tube 8 after passing the valve 10 which may be closed when the system is not in operation.

As shown by way of example in Figure 1, the foam-suppressing means is applied to a vessel having a rather elaborate system of bilge pumps indicated generally at 12. The bilge pump system 12 itself is not a feature of the present invention, it being obvious from Figure 1 that the tube 14 is merely a continuation of the tube 8, and could, if desired, be integral therewith. The tube 14 passes to a suitable pump 16 which may be a gear pump as indicated and may be located at any desired position. It will be observed that the mixture of suppressor material and water takes place first in the fitting 6 and to a greater extent in the pump 16. A valve 18 is provided as shown on the outer side of the pump 16, which valve along with the valve 10 is closed when the system is not in operation. Tube 20 leads from valve 18 and is divided into tubes 22 and 24. Tube 22 leads to the bow of the ship and may suitably be again divided into port and starboard tubes 26 and 28, which lead to nozzles 27 and 29. The nozzles may preferably be mounted in convenient location to expel the fluid at the point of greatest foam formation, which point, of course, is dependent upon the shape of the hull involved. Tube 24 similarly leads to the stern of the vessel and is similarly mounted to expel material into the propeller tunnel slightly forward of the propeller itself, so that an additional intimate mixing of the foam-suppressing emulsion and the sea water takes place as the propeller revolves, thus resulting in optimum mixture of agent and sea water immediately behind the vessel where the propeller-churned water comes to the surface. No special design of nozzles 27 and 29 is required; it is merely necessary that a suitable opportunity for immediate spread of the expelled emulsion be had.

At 6 is diagrammatically illustrated a useful form suction fitting operating on the Venturi principle and well known to those familiar with the art. The tube 5 leading into the fitting is slightly constricted at 30 and is held in casing 6 into which tube 4, of considerably less diameter, leads. Suction will be set up in a well-known manner by the flow of water through the constriction at 30, drawing material from tube 4 into the main stream and continuing on through tube 8. The invention is not to be limited to the particular type of suction fitting shown.

While no specific volume of sea water or of foam-suppressing material has been found critical for suppression of foam formed by the vessel, such quantities being considerably modified by the form of the hull, the size of the vessel and its speed, it may be generally suggested that about .20% of the mixture coming from the fitting 6 be suppressor fluid from tank 3, and that approximately 30% of this emulsified mixture be delivered into the tube 22, ½ of this fraction to be expelled from the ship through each of the nozzles 27 and 29, the remaining 70% to be expelled through the tube 24 at the wake-forming point in the stern of the vessel, the additional quantity at the stern being necessitated by the churning of the propeller or other driving means. It may be generally stated that a vessel of approximately 30 feet in length may suitably deliver from the forward nozzles approximately two gallons per minute each at about 5 pounds pressure, and approximately 9–10 gallons per minute at the stern of the vessel. These quantities, of course, will vary considerably for the shape and size of the vessel and for the type of weather conditions encountered.

A valve 32 may desirably be provided, which controls a bilge pump outlet conduit 33 leading to a bilge pump outlet at the side of the vessel. A petcock may be provided as indicated at 34, for draining the system.

In installing a defoaming system according to the invention, in a vessel such as an amphibious craft, for example, the valves 10 and 18 may be operated by controls diagrammatically illustrated at 35, and 37 which may desirably be located in back of the driver's seat. When operating the defoaming apparatus, these valves are in the open position, as indicated.

Where the bilge pump system is utilized in connection with the present invention, as suggested in the diagrammatic illustration, the valves 32, 38, 39, 40, 41, and the drain valve 42 of the bilge system are all in the closed position as indicated, when the defoaming system is in operation. These valves may desirably be located in front of the driver's seat in the amphibious vessel.

As hereinbefore stated, the valves 10 and 18 are closed when the defoaming system is not in operation. Then the valves of the bilge pump system may be opened for the discharge of bilge water from the vessel.

The invention may be employed in any type of vessel.

It will be understood that various changes in the details and construction of the method and apparatus illustrated and described herein may be made without departing from the spirit of the invention or the scope of the appended claims.

We claim:

1. The method of suppressing the wake of a vessel moving on the surface of water which includes the steps of drawing water into the vessel, combining such water with foam-disrupting material and expelling the so-treated water from the vessel.

2. The method as claimed in claim 1 in which a portion of the treated water drawn into the vessel is expelled at the bow of the vessel and the remainder is expelled near the driving means for the vessel.

3. Steps in a method of suppressing the wake of a vessel moving on the surface of the water, comprising drawing water into the vessel, intimately mixing the water with foam modifying material, and discharging the mixture from the vessel at points in the wake forming zone.

4. Steps in a method of suppressing the wake of a vessel moving on the surface of water, comprising drawing water into the vessel, intimately mixing the water with foam modifying material, agitating the mixture and forming an emulsion, and discharging the emulsion from the vessel at points in the region of wake formation.

5. Steps in a method of suppressing the wake of a vessel moving on the surface of water, comprising drawing water into the vessel, intimately mixing with a large proportion of water, a small proportion of foam modifying material, and discharging the mixture from the vessel at points in the wake forming zone.

6. A method according to claim 5 in which the foam modifying material constitutes approximately .20% of the mixture.

7. A method according to claim 3 in which said water is sea water and said foam modifying material is a hydrocarbon material.

8. A method according to claim 3 in which said foam modifying material is hydro-carbon oil having a viscosity within the range between that of kerosene and Diesel fuel oil.

9. Apparatus for suppressing the visible wake formed by a vessel moving on water including means to draw water into the vessel, means to combine the said water with a foam-suppressing material and means to distribute said combination of water and material from the vessel to points of foam formation as the vessel moves through the water.

10. In combination in apparatus for suppressing the visible wake formed by a vessel moving on water, means for drawing water into the vessel, means for initially mixing said water with foam modifying material, means for further mixing and agitating said mixture, and means to discharge said mixture from the vessel at points in the region of foam formation.

11. Apparatus according to claim 10 in which said initial mixing means comprises a venturi and said further mixing means comprises a gear pump.

12. In combination with the bilge pump system of a vessel, comprising valve controlled conduits connected with a conduit including a pump and a valve controlled bilge pump outlet conduit beyond the pump, an intake conduit for water from outside the vessel, a conduit for foam modifying material discharging into said water intake conduit to form a mixture, a mixture conduit discharging into said pump conduit, a valve in said mixture conduit, a mixture conveying conduit connected to said bilge pump outlet conduit beyond said pump, a valve in said mixture conveying conduit and mixture discharge conduit means beyond said valve for discharging said mixture in the zone of wake formation.

13. In combination in apparatus for suppressing the visible wake formed by a vessel moving on water, an intake conduit for drawing water into the vessel, a tank for foam suppressing material, delivering to said intake conduit provided with a suction device for mixing the material with the intake water, a mixture conduit beyond the suction device, a valve in said mixture conduit, a pump in said mixture conduit providing further agitation and mixing of the mixture, and mixture discharge conduit means beyond said pump for discharging said mixture in the zone of wake formation.

ALFRED C. REDFIELD.
ALLYN C. VINE.